(12) United States Patent
Xue et al.

(10) Patent No.: US 12,062,210 B2
(45) Date of Patent: Aug. 13, 2024

(54) DATA PROCESSING METHOD AND APPARATUS

(71) Applicant: HUAWEI TECHNOLOGIES CO., LTD., Guangdong (CN)

(72) Inventors: Changliang Xue, Beijing (CN); Jianfei Li, Shenzhen (CN); Yuxin Fu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 693 days.

(21) Appl. No.: 17/189,474

(22) Filed: Mar. 2, 2021

(65) Prior Publication Data

US 2021/0183100 A1   Jun. 17, 2021

Related U.S. Application Data

(63) Continuation of application No. PCT/CN2019/108581, filed on Sep. 27, 2019.

(30) Foreign Application Priority Data

Sep. 30, 2018   (CN) .......................... 201811156022.1

(51) Int. Cl.
*G06T 7/73*    (2017.01)
*G06T 17/00*   (2006.01)

(52) U.S. Cl.
CPC ............... *G06T 7/75* (2017.01); *G06T 17/00* (2013.01)

(58) Field of Classification Search
None
See application file for complete search history.

(56) References Cited

U.S. PATENT DOCUMENTS 8,649,565 B1    2/2014  Kim et al.
11,080,919 B2 *  8/2021  Yu ........................... G06T 15/04
(Continued)

FOREIGN PATENT DOCUMENTS

CN    103123727 A    5/2013
CN    103134594 A    6/2013
(Continued)

OTHER PUBLICATIONS

Geneva et al ("LIPS: LIDAR-Inertial 3D Plane SLAM", University of Delaware (UD) College of Engineering, UD Cybersecurity Initiative, the NSF (IIS-1566129), and the DTRA (HDTRAI-16-1-0039), Sep. 7, 2018, XP055842989, pp. 1-9) (Year: 2018).*
(Continued)

*Primary Examiner* — Leon Q Nguyen
(74) *Attorney, Agent, or Firm* — HUAWEI TECHNOLOGIES CO., LTD.

(57) ABSTRACT

This application relates to the field of artificial intelligence. The technology includes: obtaining data of each three-dimensional point in a first three-dimensional point set, where the data of each three-dimensional point is collected when an intelligent device is in a first position, and the first three-dimensional point set includes a plurality of three-dimensional points located in a first coordinate system; determining a first three-dimensional point subset from the first three-dimensional point set, where the first three-dimensional point subset forms a first plane; calculating a plurality of first distances, which is a distance between a first three-dimensional point and the first position; determining a target first three-dimensional point from the first three-dimensional point subset based on the plurality of first distances; and locating the intelligent device by using the target first three-dimensional point as a constraint to obtain a pose of the first position.

18 Claims, 4 Drawing Sheets

(56) References Cited

U.S. PATENT DOCUMENTS

| | | | | |
|---|---|---|---|---|
| 11,506,500 | B2* | 11/2022 | Zhang | ................... G01C 21/206 |
| 2017/0282732 | A1 | 10/2017 | Lewis et al. | |
| 2018/0131924 | A1 | 5/2018 | Jung et al. | |

FOREIGN PATENT DOCUMENTS

| | | | |
|---|---|---|---|
| CN | 103814502 | A | 5/2014 |
| CN | 103941750 | A | 7/2014 |
| CN | 103983961 | A | 8/2014 |
| CN | 104007432 | A | 8/2014 |
| CN | 104240297 | A | 12/2014 |
| CN | 103247225 | B | 4/2015 |
| CN | 105823417 | A | 8/2016 |
| CN | 105913489 | A | 8/2016 |
| CN | 107179086 | A | 9/2017 |
| CN | 107294154 | A | 10/2017 |
| CN | 107813714 | A | 3/2018 |
| CN | 108171780 | A | 6/2018 |
| CN | 108280866 | A | 7/2018 |
| CN | 105184855 | B | 9/2018 |
| CN | 106066154 | B | 2/2019 |
| CN | 109903330 | A | 6/2019 |
| CN | 105783936 | B | 9/2019 |
| CN | 107462897 | B | 1/2020 |
| WO | 2018049581 | A1 | 3/2018 |
| WO | 2018126083 | A1 | 7/2018 |

OTHER PUBLICATIONS

Li Mengdi et al,"A RANSAC-based stable plane fitting method of point clouds", Science of Surveying and Mapping, vol. 10 No. 1, Jan. 2015, total 6 pages. With an English Abstract.

Joel A. Hesch et al,"A Laser-Aided Inertial Navigation System (L-INS) for Human Localization in Unknown Indoor Environments", 2010 IEEE International Conference on Robotics and Automation Anchorage Convention District, May 3-8, 2010, Anchorage, Alaska, USA, total 7 pages.

G. Ajay Kumar et al,"A LiDAR and IMU Integrated Indoor Navigation System for UAVs and Its Application in Real-Time Pipeline Classification", Sensors 2017, 17, 1268; doi:10.3390/s17061268, total 24 pages.

Patrick Geneva et al,"LIPS: LiDAR-Inertial 3D Plane SLAM", 2018 IEEE/RSJ International Conference on Intelligent Robots and Systems (IROS), Jan. 7, 2019, total 8 pages.

Aaron Montoya et al,"Flight autonomy of micro-drone in indoor environments using LiDAR flash camera", HAL Id: hal-00939230, https://hal-enac.archives-ouvertes.fr/hal-00939230, Submitted on May 20, 2014, total 9 pages.

Ji Zhang et al,"LOAM: Lidar Odometry and Mapping in Real-time", Conference: Robotics: Science and Systems ConferenceAt: Berkeley, CA, Jul. 2014, total 9 pages.

Pedro F. Proenca et al,"Probabilistic Combination of Noisy Points and Planes for RGB-D Odometry", arXiv:1705.06516v1 [cs.CV] May 18, 2017, total 11 pages.

Patrick Geneva et al, LIPS: LiDAR-Inertial 3D Plane SLAM, Robot Perception and Navigation Group (RPNG) Tech Report—RPNG-2018-LIPS, Last Updated-Jul. 31, 2018, XP055842772, total 25 pages.

Patrick Geneva et al, LIPS: LiDAR-Inertial 3D Plane SLAM , University of Delaware (UD) College of Engineering, UD Cybersecurity Initiative, the NSF (IIS-1566129), and the DTRA (HDTRAI-16-1-0039), Oct. 2018, XP055842989, total 9 pages.

\* cited by examiner

DATA PROCESSING METHOD AND APPARATUS

CROSS-REFERENCE TO RELATED APPLICATIONS

This application is a continuation of International Application No. PCT/CN2019/108581, filed on Sep. 27, 2019, which claims priority to Chinese Patent Application No. 201811156022.1, filed on Sep. 30, 2018. The disclosures of the aforementioned applications are hereby incorporated by reference in their entireties.

TECHNICAL FIELD

This application relates to the field of artificial intelligence, and more specifically, to a data processing method and apparatus.

BACKGROUND

A simultaneous localization and mapping (SLAM) technology is a key capability on which robots can rely to explore unknown environments. When there is no prior information of an environment, a robot observes features of the ambient environment by using a sensor (such as a camera or a laser) mounted in the robot, constructs an optimization target that is based on a related observation constraint, and then by solving the optimization target, completes a system state vector, that is, completing estimation of an environment feature position and a robot pose, while completing mapping and self-locating.

In the current field of SLAM technologies, a laser radar and/or a camera are/is mainly used to observe landmarks in the ambient environment. In laser radar-based SLAM, a method for estimating a robot motion attitude is: registering point cloud data collected by an inertial measurement unit (IMU) and a laser radar based on the IMU, and extracting all line feature points and all plane feature points from the registered point cloud data in each frame; then transforming projection of all line feature points and all plane feature points in a current frame into a coordinate system of a previous frame based on a last estimated pose, and matching points respectively closest to all the line feature points and all the plane feature points; and then establishing constraints based on distances from the foregoing line feature points to a corresponding line and distances from the foregoing plane feature points to a corresponding plane, and performing iterative optimization by using a Levenberg-Marquardt (LM) algorithm to solve an optimal motion pose. In the method, iterative optimization solution needs to be performed on constraints constructed from a large quantity of feature points. In this way, a calculation amount is relatively large, and calculation resources are wasted, and time overheads are increased.

Therefore, how to reduce calculation resources and calculation time overheads in a SLAM motion attitude estimation process and improve operation efficiency of the entire SLAM process becomes an urgent problem to be resolved.

SUMMARY

This application provides a data processing method and apparatus, which can reduce overheads of calculation resources and calculation time, and improve operation efficiency of an entire SLAM process.

According to a first aspect, this application provides a data processing method, where the method includes: obtaining data of each three-dimensional point in a first three-dimensional point set, where the data of each three-dimensional point is collected when an intelligent device is in a first position, and the first three-dimensional point set includes a plurality of three-dimensional points located in a first coordinate system; determining a first three-dimensional point subset from the first three-dimensional point set, where the first three-dimensional point subset forms a first plane, and the first plane is any plane within the first coordinate system; calculating a plurality of first distances, where the first distance is a distance between a first three-dimensional point and the first position, the first distance is in a one-to-one correspondence with the first three-dimensional point, and the first three-dimensional point is any three-dimensional point in the first three-dimensional point subset; determining a target first three-dimensional point from the first three-dimensional point subset based on the plurality of first distances; and locating the intelligent device by using the target first three-dimensional point as a constraint to obtain a pose of the first position.

According to the method in this embodiment of this application, the target first three-dimensional point is determined from the first three-dimensional point subset, the first three-dimensional point subset includes the plurality of three-dimensional points, and the target first three-dimensional point in the first three-dimensional point subset is used as a constraint, so that a calculation amount and calculation time overheads of subsequent steps may be reduced, and operation efficiency of an entire SLAM process may be improved.

In a possible implementation, the locating the intelligent device by using the target first three-dimensional point as a constraint includes: determining the constraint based on the target first three-dimensional point, where the constraint is used to affect a locating process of the intelligent device.

In a possible implementation, the method further includes: performing, by using the target first three-dimensional point as a constraint, mapping on an area that the intelligent device passes.

In a possible implementation, the target first three-dimensional point is a three-dimensional point at a smallest distance from the first position in the first three-dimensional point subset.

According to the method in this embodiment of this application, the target first three-dimensional point is a three-dimensional point at a smallest distance from an origin of the first coordinate system, that is, a point at a closest distance from the origin of the first coordinate system, so as to subsequently represent a plane feature of the first plane by using the target first three-dimensional point as a parameter.

In a possible implementation, the first position is the origin of the first coordinate system and the first distance is the distance between the three-dimensional point corresponding to the first distance and the origin of the first coordinate system.

According to the method in this embodiment of this application, the first coordinate system is a relative coordinate system that uses the first position as an origin, and the first plane is located in the first coordinate system, so that singularity of the plane feature of the first plane can be eliminated, thereby improving robustness of a SLAM method.

In a possible implementation, the method further includes: obtaining data of each three-dimensional point in a second three-dimensional point set, where the data of each three-dimensional point in the second three-dimensional point set is collected when the intelligent device is in a second position, and the second three-dimensional point set includes a plurality of three-dimensional points located in a second coordinate system; determining a second three-dimensional point subset from the second three-dimensional point set, where the second three-dimensional point subset forms a second plane, and the second plane is any plane within the second coordinate system; calculating a plurality of second distances, where the second distance is a distance between a second three-dimensional point and the second position, the second distance is in a one-to-one correspondence with the second three-dimensional point, and the second three-dimensional point is any three-dimensional point in the second three-dimensional point subset; and determining a target second three-dimensional point from the second three-dimensional point subset based on the plurality of second distances.

In a possible implementation, the locating the intelligent device by using the target first three-dimensional point as a constraint includes: locating the intelligent device by using a residual between a first vector and a second vector as a constraint, where the residual includes a distance between the first vector and the second vector, the first vector starts from the first position, the first vector ends at the target first three-dimensional point, the first vector is used to determine the first plane in the first coordinate system, the second vector starts from the second position, the second vector ends at the target second three-dimensional point, and the second vector is used to determine the second plane in the second coordinate system.

In a possible implementation, the target second three-dimensional point is a three-dimensional point at a smallest distance from the second position in the second three-dimensional point subset.

In a possible implementation, the second position is an origin of the second coordinate system and the second distance is the distance between the three-dimensional point corresponding to the second distance and the origin of the second coordinate system.

In a possible implementation, before the using a residual between a first vector and a second vector as a constraint, the method further includes: determining projection of the second vector in the first coordinate system, and using a residual between projection of the first vector in the first coordinate system and the projection of the second vector in the first coordinate system as a constraint when a distance between the projection of the first vector in the first coordinate system and the projection of the second vector in the first coordinate system is less than or equal to a preset distance.

In a possible implementation, before the using a residual between a first vector and a second vector as a constraint, the method further includes: determining projection of the first vector in the second coordinate system, and using a residual between the projection of the first vector in the second coordinate system and projection of the second vector in the second coordinate system as a constraint when a distance between the projection of the first vector in the second coordinate system and the projection of the second vector in the second coordinate system is less than or equal to a preset distance.

According to the method in this embodiment of this application, the first vector and the second vector are projected into a same relative coordinate system, and the residual between the first vector and the second vector can be calculated, thereby improving the robustness of the SLAM method.

In a possible implementation, the locating the intelligent device by using a residual between a first vector and a second vector as a constraint includes: obtaining motion status information collected by an inertial measurement unit, where the motion status information includes motion status information used when the intelligent device collects data of the first three-dimensional point in the first position and motion status information used when the intelligent device collects data of the second three-dimensional point in the second position; and locating the intelligent device by using the motion status information and the residual between the first vector and the second vector as a constraint.

According to the method in this embodiment of this application, the intelligent device is located by using the motion status information and the residual between the first vector and the second vector as a constraint, where a plane feature factor and a pre-integration factor are combined, so that precision of a SLAM system can be improved.

According to a second aspect, this application provides a data processing apparatus, where the apparatus includes: an obtaining module, configured to obtain data of each three-dimensional point in a first three-dimensional point set, where the data of each three-dimensional point is collected when an intelligent device is in a first position, and the first three-dimensional point set includes a plurality of three-dimensional points located in a first coordinate system; a first determining module, configured to determine a first three-dimensional point subset from the first three-dimensional point set, where the first three-dimensional point subset forms a first plane, and the first plane is any plane within the first coordinate system; a calculation module, configured to calculate a plurality of first distances, where the first distance is a distance between a first three-dimensional point and the first position, the first distance is in a one-to-one correspondence with the first three-dimensional point, and the first three-dimensional point is any three-dimensional point in the first three-dimensional point subset; a second determining module, configured to determine a target first three-dimensional point from the first three-dimensional point subset based on the plurality of first distances; and a locating module, configured to locate the intelligent device by using the target first three-dimensional point as a constraint to obtain a pose of the first position.

According to the apparatus in this embodiment of this application, the target first three-dimensional point is determined from the first three-dimensional point subset, the first three-dimensional point subset includes the plurality of three-dimensional points, and the target first three-dimensional point in the first three-dimensional point subset is used as a constraint, so that a calculation amount and calculation time overheads of subsequent steps may be reduced, and operation efficiency of an entire SLAM process may be improved.

In a possible implementation, the locating module is further configured to determine the constraint based on the target first three-dimensional point, where the constraint is used to affect a locating process of the intelligent device.

In a possible implementation, the apparatus further includes: a mapping module, configured to perform, by using the target first three-dimensional point as a constraint, mapping on an area that the intelligent device passes.

In a possible implementation, the target first three-dimensional point is a three-dimensional point at a smallest distance from the first position in the first three-dimensional point subset.

According to the apparatus in this embodiment of this application, the target first three-dimensional point is a three-dimensional point at a smallest distance from an origin of the first coordinate system, that is, a point at a closest distance from the origin of the first coordinate system, so as to subsequently represent a plane feature of the first plane by using the target first three-dimensional point as a parameter.

In a possible implementation, the first position is the origin of the first coordinate system and the first distance is the distance between the three-dimensional point corresponding to the first distance and the origin of the first coordinate system.

According to the apparatus in this embodiment of this application, the first coordinate system is a relative coordinate system that uses the first position as an origin, and the first plane is located in the first coordinate system, so that singularity of the plane feature of the first plane can be eliminated, thereby improving robustness of a SLAM method.

In a possible implementation, the obtaining module is further configured to obtain data of each three-dimensional point in a second three-dimensional point set, where the data of each three-dimensional point in the second three-dimensional point set is collected when the intelligent device is in a second position, and the second three-dimensional point set includes a plurality of three-dimensional points located in a second coordinate system; the first determining module is further configured to determine a second three-dimensional point subset from the second three-dimensional point set, where the second three-dimensional point subset forms a second plane, and the second plane is any plane within the second coordinate system; the calculation module is further configured to calculate a plurality of second distances, where the second distance is a distance between a second three-dimensional point and the second position, the second distance is in a one-to-one correspondence with the second three-dimensional point, and the second three-dimensional point is any three-dimensional point in the second three-dimensional point subset; and the second determining module is further configured to determine a target second three-dimensional point from the second three-dimensional point subset based on the plurality of second distances.

In a possible implementation, the locating module is specifically configured to locate the intelligent device by using a residual between a first vector and a second vector as a constraint, where the residual includes a distance between the first vector and the second vector, the first vector starts from the first position, the first vector ends at the target first three-dimensional point, the first vector is used to determine the first plane in the first coordinate system, the second vector starts from the second position, the second vector ends at the target second three-dimensional point, and the second vector is used to determine the second plane in the second coordinate system.

In a possible implementation, the target second three-dimensional point is a three-dimensional point at a smallest distance from the second position in the second three-dimensional point subset.

In a possible implementation, the second position is an origin of the second coordinate system and the second distance is the distance between the three-dimensional point corresponding to the second distance and the origin of the second coordinate system.

In a possible implementation, the locating module is specifically configured to: determine projection of the second vector in the first coordinate system, and use a residual between projection of the first vector in the first coordinate system and the projection of the second vector in the first coordinate system as a constraint when a distance between the projection of the first vector in the first coordinate system and the projection of the second vector in the first coordinate system is less than or equal to a preset distance.

In a possible implementation, the locating module is specifically configured to: determine projection of the first vector in the second coordinate system, and use a residual between the projection of the first vector in the second coordinate system and projection of the second vector in the second coordinate system as a constraint when a distance between the projection of the first vector in the second coordinate system and the projection of the second vector in the second coordinate system is less than or equal to a preset distance.

According to the apparatus in this embodiment of this application, the first vector and the second vector are projected into a same relative coordinate system, and the residual between the first vector and the second vector can be calculated, thereby improving the robustness of the SLAM method.

In a possible implementation, the locating module is specifically configured to: obtain motion status information collected by an inertial measurement unit, where the motion status information includes motion status information used when the intelligent device collects data of the first three-dimensional point in the first position and motion status information used when the intelligent device collects data of the second three-dimensional point in the second position; and locate the intelligent device by using the motion status information and the residual between the first vector and the second vector as a constraint.

According to the apparatus in this embodiment of this application, the intelligent device is located by using the motion status information and the residual between the first vector and the second vector as a constraint, where a plane feature factor and a pre-integration factor are combined, so that precision of a SLAM system can be improved.

Each module included in the apparatus in the second aspect may be implemented in a software and/or hardware manner.

For example, each module included in the apparatus in the second aspect may be implemented by a processor, that is, the apparatus in the second aspect may include a processor, and the processor is configured to execute program instructions, so as to implement each function that can be implemented by each module included in the apparatus.

Optionally, the apparatus in the second aspect may include a memory, configured to store the program instructions executed by the processor and even store various data.

Optionally, the apparatus in the second aspect may be an intelligent device, such as an intelligent robot or an unmanned aerial vehicle. The apparatus may further include a receiver or a transmitter.

Optionally, the apparatus in the second aspect may be a chip that can be integrated into an intelligent device, and in this case, the apparatus may further include a communications interface.

According to a third aspect, this application provides a computer-readable storage medium. The computer-readable storage medium stores program code to be executed by a data processing apparatus. The program code includes instructions for performing the method in the first aspect or any possible implementation of the first aspect.

According to a fourth aspect, this application provides a computer program product including instructions. When the computer program product is run on a data processing apparatus, the apparatus is enabled to perform the method in the first aspect or any possible implementation of the first aspect.

According to the method in the embodiments of this application, the target first three-dimensional point is determined from the first three-dimensional point subset, the first three-dimensional point subset includes the plurality of three-dimensional points, and the target first three-dimensional point in the first three-dimensional point subset is used as a constraint, so that a calculation amount and calculation time overheads of subsequent steps may be reduced, and operation efficiency of an entire SLAM process may be improved.

DESCRIPTION OF EMBODIMENTS

The following describes technical solutions of this application with reference to accompanying drawings.

The embodiments of this application are applicable to the field of simultaneous localization and mapping (SLAM) and any intelligent device for state marginalization processing in nonlinear estimation problems.

It should be understood that the intelligent device means any device, appliance, or machine having a computing processing capability. The intelligent device in the embodiments of this application may be a robot, an autonomous vehicle, an unmanned aerial vehicle, a smart home, a mobile phone terminal, and the like, and the intelligent device is not limited in this application.

Figure 1:
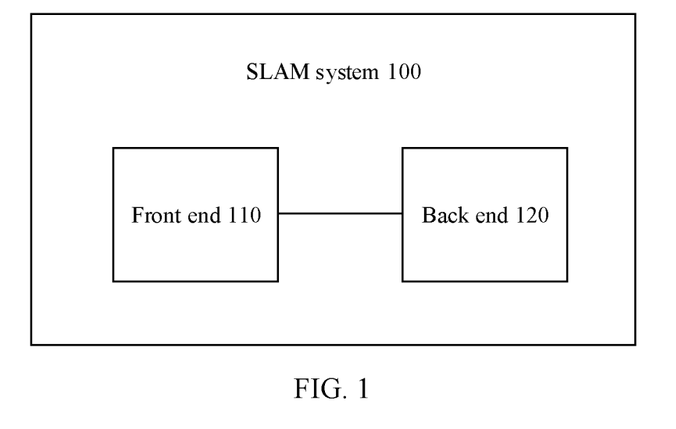
FIG. 1 is a schematic diagram of an application scenario of a technical solution according to an embodiment of this application.

FIG. 1 is a schematic diagram of an application scenario of a technical solution according to an embodiment of this application. As shown in FIG. 1, the technical solution of this embodiment of this application is applicable to a SLAM system 100 of an intelligent device. The SLAM system includes a front end 110 and a back end 120. The front end 110 mainly completes data collection and data association of a sensor, and a main function of the back end 120 is performing parameter estimation and optimization on a model generated by the front end. The following describes the technical solution of this embodiment of this application by using an intelligent device as an example.

In this embodiment of this application, an intelligent device using an IMU and a laser radar sensor as observation input sensors is used as an example. The IMU collects motion status information of the intelligent device, for example, the motion status information may include an angular velocity and a linear acceleration of a SLAM apparatus; the laser radar collects a three-dimensional (3D) point cloud (referred to as "3D point cloud" for short below) of an ambient environment of the intelligent device, the 3D point cloud includes a plurality of three-dimensional points (also referred to as "3D point" below) in the ambient environment of the intelligent device, and the three-dimensional point can be understood as a point having three-dimensional coordinate values.

Optionally, a three-dimensional coordinate system may be used to represent three-dimensional coordinate values of 3D points.

For example, three-dimensional coordinate values of a 3D point may be represented by a three-dimensional coordinate position (x, y, z) in a spatial rectangular coordinate system, where x represents a horizontal axis coordinate, y represents a vertical axis coordinate, and z represents an upright axis coordinate.

Figure 2:
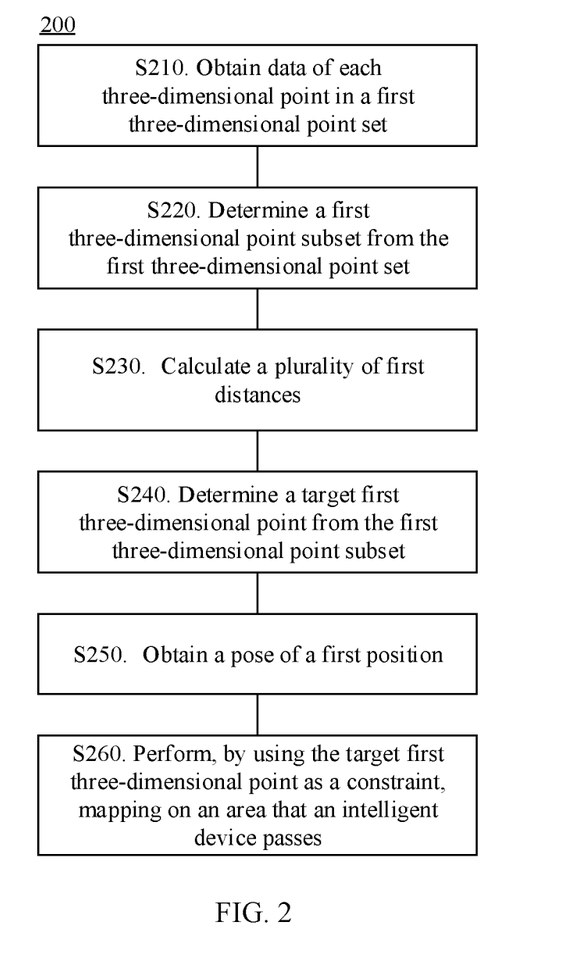
FIG. 2 is a schematic flowchart of a data processing method according to an embodiment of this application.

FIG. 2 is a schematic flowchart of a data processing method according to an embodiment of this application. It should be understood that FIG. 2 shows steps or operations of the method, but these steps or operations are merely examples. Another operation or variation of each operation in FIG. 2 may be further performed in this embodiment of this application, or not all steps need to be performed, or these steps may be performed in other sequences.

The method of FIG. 2 may be performed by the SLAM system 100 in FIG. 1, and the method includes the following steps.

S210. Obtain data of each 3D point in a first 3D point set, where the data of each 3D point is collected when an intelligent device is in a first position, and the first 3D point set includes a plurality of 3D points located in a first coordinate system.

Optionally, S210 may be performed by the front end 110 of the SLAM system in FIG. 1.

A 3D point cloud that is of a current frame and that is collected by a laser radar sensor in the intelligent device is obtained, where the 3D point cloud may be a 3D point set including a plurality of 3D points, and therefore, the 3D point cloud collected from the current frame may also be referred to as a first 3D point set.

In this embodiment of this application, when the intelligent device is located in the first position, an ambient environment is observed, and the first 3D point set including a plurality of 3D points may be obtained.

Optionally, the foregoing first position may be a position in which a center point of the intelligent device is located, or may be a position in which a center point of a sensor on the intelligent device is located (the sensor herein may be a laser radar or an inertial measurement unit), or may be a position in which a landing point of the intelligent device is located, or may be another point or position that has a fixed position relative to the intelligent device. This is not limited in this embodiment of this application.

In this embodiment of this application, motion status information that is of the current frame and that is collected by the IMU in the intelligent device may be obtained. Optionally, time synchronization may be performed on the collected first 3D point set and the collected motion status information.

The time synchronization may also be understood as performing time alignment or time registration on the first 3D point set and the motion status information.

Performing time synchronization on the collected first 3D point set and the collected motion status information may mean determining the first 3D point set and the motion status information at a same moment corresponding to the first 3D point set. It should be understood that the motion status information herein may mean the motion status information of the intelligent device used when the first 3D point set is collected.

In this embodiment of this application, the first coordinate system may be an absolute coordinate system (the absolute coordinate system may also be referred to as a global coordinate system or a world coordinate system). Positions of coordinate axes and an origin of the absolute coordinate system are fixed and do not change with movement of the intelligent device.

Optionally, the first coordinate system may be a relative coordinate system. A relative position between the intelligent device and each of coordinate axes and an origin of the relative coordinate system is fixed and does not change with movement of the intelligent device.

Optionally, when the origin of the relative coordinate system is the center point of the intelligent device, the relative coordinate system may also be referred to as a local coordinate system.

S220. Determine a first 3D point subset from the first 3D point set, where the first 3D point subset forms a first plane, and the first plane is any plane within the first coordinate system.

The first 3D point set may be a 3D point cloud that is of the current frame and that is collected by the laser radar.

Optionally, S220 may be performed by the front end 110 of the SLAM system in FIG. 1.

In this embodiment of this application, the first 3D point set may be divided into one or more 3D point subsets, a plurality of 3D points in a same 3D point subset may belong to a same plane, and the one or more 3D subsets obtained by dividing the first 3D point set may be referred to as first 3D point subsets. In other words, plane division is performed on a plurality of 3D points included in the first 3D point set.

For example, plane division may be performed on 3D points in the first 3D point set by using a random sample consensus (RANSAC) algorithm.

Optionally, the first 3D point subset may include a plurality of 3D points. The plurality of 3D points in the first 3D point subset may be located in a same plane.

Optionally, the plurality of 3D points in the first 3D point subset may be located in the first plane, and the first plane may be one of a plurality of planes corresponding to the plurality of 3D points in the first 3D point set.

In other words, the first plane is located in the first coordinate system.

In a possible implementation of this embodiment of this application, noise in the first 3D point subset may be removed. For example, the noise in the first 3D point subset may be removed by using a Huber algorithm.

In this embodiment of this application, the noise in the first 3D point subset is removed, so that noise impact generated by plane division may be reduced or removed, and robustness of the plane division may be improved.

S230. Calculate a plurality of first distances, where the first distance is a distance between a first 3D point and the first position, the first distance is in a one-to-one correspondence with the first three-dimensional point, and the first 3D point is any 3D point in the first 3D point subset.

The plurality of first distances may be in a one-to-one correspondence with the plurality of 3D points in the first 3D point subset, and the first distance may be a distance between the 3D point corresponding to the first distance and the first position.

Optionally, S230 may be performed by the front end 110 of the SLAM system in FIG. 1.

In this embodiment of this application, the first position may be an origin of the first coordinate system, and therefore, the first distance may be a distance between the 3D point corresponding to the first distance and the origin of the first coordinate system.

For example, the first coordinate system may be a local coordinate system. In this case, coordinates of the plurality of 3D points in the first 3D point set collected from the current frame may be coordinates in the local coordinate system. It should be understood that the local coordinate system is one of relative coordinate systems.

In this embodiment of this application, when the first coordinate system is a local coordinate system, singularity of a plane feature of the first plane can be eliminated, thereby improving robustness of a SLAM method.

S240. Determine a target first 3D point from the first 3D point subset based on the plurality of first distances.

Optionally, S240 may be performed by the front end 110 of the SLAM system in FIG. 1.

In a possible implementation of this embodiment of this application, the target first 3D point may be a 3D point at a smallest distance from the first position in the first 3D point subset.

Optionally, the target first 3D point may be a 3D point at a smallest distance from the origin of the first coordinate system in the first 3D point subset.

In this application, the target first 3D point may be used as a parameter to represent the plane feature of the first plane, and a plane feature model of the first plane may be constructed by using coordinates of the target first 3D point.

A plane feature of a plane to which the plurality of 3D points in the first 3D point subset belong may be referred to as the plane feature of the first plane corresponding to the first 3D point subset.

Optionally, the target first 3D point may be another 3D point in the first 3D point subset that satisfies a preset condition. For example, the target first 3D point may be a 3D point at a distance from the origin of the first coordinate system in the first 3D point subset that is equal to a preset distance.

Optionally, when the target first 3D point is a 3D point at a smallest distance from the origin of the first coordinate system in the first 3D point subset, the constructed plane feature model of the first plane may be referred to as a closest point (CP) model of the first plane.

In this embodiment of this application, the target first 3D point is a 3D point at a smallest distance (that is, the closest distance) from the origin of the first coordinate system, so that the first plane is subsequently expressed in a form of a vector by using the target first 3D point.

For example, a manner of constructing the CP model of the first plane by using the coordinates of the target first 3D point is shown in Formula (1):

$$^{G}\Pi = \begin{bmatrix} ^{G}\Pi(x) \\ ^{G}\Pi(y) \\ ^{G}\Pi(z) \end{bmatrix} \quad (1)$$

$^{G}\Pi(x)$ represents an x-axis coordinate of the target first 3D point in a global coordinate system G, $^{G}\Pi(y)$ represents a y-axis coordinate of the target first 3D point in the global coordinate system G, $^{G}\Pi(z)$ represents a z-axis coordinate of the target first 3D point in the global coordinate system G, and $^{G}\Pi$ is a CP model of the first plane in the global coordinate system G.

$^G\Pi$ may be expressed in a form of a vector by using Formula (2) and Formula (3):

$$^G\Pi = {^G}n{^G}d; \quad (2)$$

$$\begin{bmatrix} {^G}n \\ {^G}d \end{bmatrix} = \begin{bmatrix} \dfrac{1}{\sqrt{{^G}\Pi(x)^2 + {^G}\Pi(y)^2 + {^G}\Pi(z)^2}} {^G}\Pi \\ \sqrt{{^G}\Pi(x)^2 + {^G}\Pi(y)^2 + {^G}\Pi(z)^2} \end{bmatrix}, \quad (3)$$

where $^G$n represents a normal vector of the first plane in the global coordinate system G, and $^G$d represents a distance between the target first 3D point and an origin of the global coordinate system G.

In this embodiment of this application, coordinates of one 3D point in the first plane are used to represent the plane feature of the plane, so that a calculation amount of subsequent steps may be reduced, time overheads may be reduced, and operation efficiency of an entire SLAM process may be improved.

S250. Locate the intelligent device by using the target first 3D point as a constraint to obtain a pose of the first position.

In this embodiment of this application, data of each 3D point in a second 3D point set may be obtained, where the data of each 3D point in the second 3D point set may be collected when the intelligent device is in a second position, and the second 3D point set includes a plurality of 3D points located in a second coordinate system.

Optionally, a second 3D point subset may be determined from the second 3D point set, where the second 3D point subset may form a second plane, and the second plane may be any plane within the second coordinate system.

Optionally, a plurality of second distances are calculated, where the second distance may be a distance between a second 3D point and the second position, the second distance is in a one-to-one correspondence with the second 3D point, and the second 3D point may be any 3D point in the second 3D point subset.

Optionally, a target second 3D point may be determined from the second 3D point subset based on the plurality of second distances.

In this embodiment of this application, the target second 3D point may be used as a parameter to represent a plane feature of the second plane, that is, a plane feature model of the second plane may be constructed by using the target second 3D point.

A plane feature of a plane to which a plurality of 3D points in the second 3D point subset belong may be referred to as the plane feature of the second plane corresponding to the second 3D point subset.

Optionally, when the target second 3D point is a 3D point at a smallest distance from an origin of the second coordinate system in the second 3D point subset, the constructed plane feature model of the second plane may be referred to as a CP model of the second plane.

In this embodiment of this application, the second plane may be a plane that is observed for the first time, that is, a plurality of 3D points in the second 3D point subset corresponding to the second plane are all observed for the first time.

In this case, the second plane may be referred to as a reference plane, the plane feature of the second plane may be referred to as a reference plane feature, and a frame in which the second 3D point set is obtained may be referred to as a reference frame, of a plane, corresponding to the second plane.

It should be understood that in a 3D point cloud collected before the reference frame, there are no points the same as the plurality of 3D points in the second 3D point subset.

In this embodiment of this application, the second position may be the origin of the second coordinate system. Optionally, the second distance may be a distance between the 3D point corresponding to the second distance and the origin of the second coordinate system.

In a possible implementation of this embodiment of this application, a constraint may be determined based on a residual between a first vector and a second vector to locate the intelligent device.

The residual may include a distance between the first vector and the second vector, the first vector may start from the first position, the first vector may end at the target first 3D point, the first vector may be used to determine the first plane in the first coordinate system, the second vector may start from the second position, the second vector may end at the target second 3D point, and the second vector may be used to determine the second plane in the second coordinate system.

It should be understood that the first vector is a vector within the first plane, and when a normal vector of the first plane is known, the first vector may uniquely determine the first plane in the first coordinate system, where the normal vector of the first plane may be obtained through calculation from a plurality of 3D points within the first plane. The second vector is similar to the first vector, and details are not further described herein.

Optionally, the first position may be the origin of the first coordinate system, in other words, the first vector starts from the origin of the first coordinate system and the first vector ends at the target first 3D point.

Optionally, the second position may be the origin of the second coordinate system, in other words, the second vector starts from the origin of the second coordinate system and the second vector ends at the target second 3D point.

In this embodiment of this application, projection of the second vector in the first coordinate system may be determined, and a constraint may be determined based on a residual between projection of the first vector in the first coordinate system and the projection of the second vector in the first coordinate system when a distance between the projection of the first vector in the first coordinate system and the projection of the second vector in the first coordinate system is less than or equal to a preset distance.

Alternatively, projection of the first vector in the second coordinate system may be determined, and a constraint may be determined based on a residual between the projection of the first vector in the second coordinate system and projection of the second vector in the second coordinate system when a distance between the projection of the first vector in the second coordinate system and the projection of the second vector in the second coordinate system is less than or equal to a preset distance.

Alternatively, projection of the first vector and the second vector in any coordinate system other than the first coordinate system and the second coordinate system may be determined, and a constraint may be determined based on a residual between the projection of the first vector and the projection of the second vector when a distance between the projection of the first vector in any coordinate system and the projection of the second vector in any coordinate system is less than or equal to a preset distance.

In a possible implementation of this embodiment of this application, a displacement change and an attitude change of the first coordinate system relative to the second coordinate system may be determined based on motion status information corresponding to the first position and motion status information corresponding to the second position.

Optionally, a conversion relationship between the first coordinate system and the second coordinate system may be obtained based on the displacement change and the attitude change of the first coordinate system relative to the second coordinate system.

For example, a transformation matrix between the first coordinate system and the second coordinate system may be obtained based on the displacement change and the attitude change of the first coordinate system relative to the second coordinate system.

In this case, the plane feature of the second plane may be projected into the first coordinate system or the plane feature of the first plane may be projected into the second coordinate system based on the conversion relationship between the first coordinate system and the second coordinate system.

An implementation of projecting the plane feature of the second plane into the first coordinate system is shown in Formula (4), Formula (5), and Formula (6):

$$\begin{bmatrix} {}^L n \\ {}^L d \end{bmatrix} = \begin{bmatrix} {}^L_A R & 0 \\ -{}^A P_L^T & 1 \end{bmatrix} \begin{bmatrix} {}^A n \\ {}^A d \end{bmatrix}; \qquad (4)$$

$$ {}^L_A R = {}^L_G R \, {}^A_G R^T; \qquad (5)$$

$$ {}^A P_L = {}^A_G R ({}^G P_L - {}^G P_A), \qquad (6)$$

where

G represents a global coordinate system, A represents a second coordinate system, L represents a first coordinate system, $^A n$ represents a normal vector of the second plane in the second coordinate system, $^L n$ represents a normal vector of the second plane in the first coordinate system, $^A d$ represents a distance between the target first 3D point and the origin of the second coordinate system, $^L d$ represents a distance between the target first 3D point and the origin of the first coordinate system, $_A^L R$ represents a rotation transformation matrix from the second coordinate system to the first coordinate system, $_G^L R$ represents a rotation transformation matrix from the global coordinate system to the first coordinate system, $_G^A R$ represents a rotation transformation matrix from the global coordinate system to the second coordinate system, $^A P_L$ represents a translation transformation matrix from the second coordinate system to the first coordinate system, $^G P_L$ represents a translation transformation matrix from the global coordinate system to the first coordinate system, and $^G P_A$ represents a translation transformation matrix from the global coordinate system to the second coordinate system.

In this embodiment of this application, a plane feature factor may be constructed based on the target first 3D point and the target second 3D point that are projected into a same coordinate system.

Optionally, the foregoing distance between the first vector (which may also be the plane feature of the first plane) and the second vector (which may also be the plane feature of the second plane) that are projected into a same coordinate system may be a Mahalanobis distance. In this application, the Mahalanobis distance may also be referred to as a Mahal distance.

Optionally, when the second plane is a reference plane, if a Mahal distance between the first vector (that is, the plane feature of the first plane) and the second vector (that is, the plane feature of the second plane) obtained after the first vector and the second vector are projected is greater than a specific threshold, the first plane may be denoted as a new reference plane and a current frame is denoted as a reference frame, of a plane, corresponding to the first plane; if the Mahal distance is less than or equal to the threshold, the second plane and the first plane are denoted as a same plane.

That the first plane is denoted as a new reference plane may be understood as: the first plane is observed for the first time in the current frame, that is, a plurality of 3D points in the first 3D point subset corresponding to the first plane are all observed for the first time.

In other words, in a 3D point cloud collected before the current frame, there are no points the same as the plurality of 3D points in the first 3D point subset.

That the second plane and the first plane are the same plane may be understood as: the first plane is not observed for the first time.

In this embodiment of this application, when the second plane and the first plane are the same plane, a plane feature factor may be constructed based on the first vector and the second vector that are projected into a same coordinate system.

Optionally, a plane feature factor may be constructed based on the residual between the first vector and the second vector that are projected into a same coordinate system. The residual may be the distance between the first vector and the second vector.

In a possible implementation of this embodiment of this application, a plane feature factor may be the residual between the first vector and the second vector that are projected into a same coordinate system. For example, Formula (7) is an implementation of determining the plane feature factor based on the residual between the first vector and the second vector that are projected into the same coordinate system:

$$r_P(x) = {}^L\Pi(x) - {}^L\hat{\Pi} \qquad (7), \text{ where}$$

$r_P(x)$ represents a residual between the projection of the second vector (that is, the plane feature of the second plane) in the first coordinate system and the first plane (that is, the plane feature of the first plane), that is, the plane feature factor, $^L\Pi_{(x)}$ represents the projection of the second vector in the first coordinate system, and $^L\hat{\Pi}$ represents the first plane.

In this embodiment of this application, because the first coordinate system in which the first plane is located and the second coordinate system in which the second plane is located are relative coordinate systems, singularity of the plane feature of the first plane and the plane feature of the second plane may be eliminated, thereby improving robustness of a SLAM method.

In this embodiment of this application, the motion status information collected by the inertial measurement unit may be obtained, and the intelligent device is located by using the motion status information and the residual between the first vector and the second vector as a constraint.

Optionally, the motion status information may include motion status information used when the intelligent device collects data of the first three-dimensional point in the first position and motion status information used when the intelligent device collects data of the second three-dimensional point in the second position.

Optionally, the motion status information may be processed to construct a pre-integration factor. For example, the motion status information may be pre-integrated, a global status observation model may be constructed based on a result of the pre-integration, and the pre-integration factor may be constructed based on the global status observation model. A method for constructing a pre-integration factor according to an embodiment of this application is shown in FIG. 3.

Figure 3:
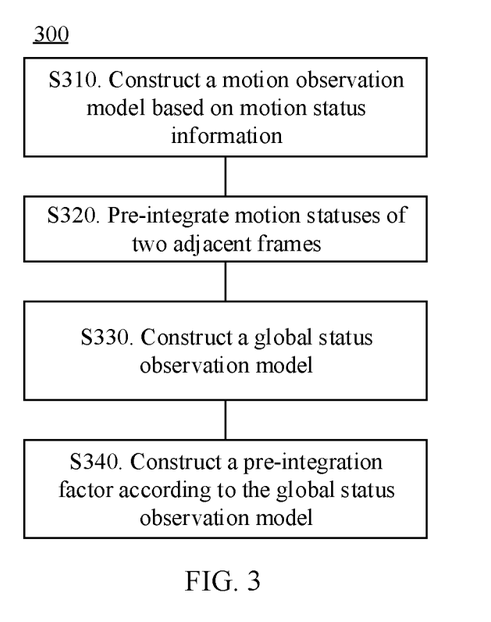
FIG. 3 is a schematic flowchart of a data processing method according to another embodiment of this application.

FIG. 3 is a schematic flowchart of a data processing method 300 according to an embodiment of this application. The method 300 may be used to process motion status information to construct a pre-integration factor.

The method of FIG. 3 may be performed by the front end 110 of the SLAM system in FIG. 1, and the method 300 includes the following steps.

S310. Construct a status observation model based on motion status information.

For example, an implementation of constructing a status observation model of an IMU based on motion status information collected by the IMU is constructing the status observation model of the IMU according to Formula (8) and Formula (9):

$$\omega_m = \omega + b_\omega + n_\omega \tag{8}$$

$$\alpha_m = \alpha + b_a + n_a + {}_G^I R G_g \tag{9}$$

where $G_g$ represents a gravity acceleration in the global coordinate G, $\tilde{\omega}$m represents a measured angular velocity, a m represents a measured linear acceleration, $\omega$ represents an angular velocity, $\alpha$ represents a linear acceleration, $b_\omega$ represents an offset error of the angular velocity, $b_a$ represents an offset error of the linear acceleration, $n_\omega$ represents noise of the angular velocity, and $n_a$ represents noise of the linear acceleration.

S320. Pre-integrate motion statuses of two adjacent frames.

Optionally, motion statuses of 3D points of the two adjacent frames may be pre-integrated according to the status observation model of the IMU.

For example, integration may be performed according to Formula (10) and Formula (11):

$$^k\alpha_{k+1} = \int_{t_k}^{t_{k+1}} \int_{t_k}^{s} {}_u^k R(\alpha_m - b_a - n_a) du\, ds \tag{10}$$

$$^k\beta_{k+1} = \int_{t_k}^{t_{k+1}} {}_u^k R(\alpha_m - b_a - n_a) du, \tag{11}$$

where $_u^k R$ is a rotation transformation matrix from a moment u to a moment k, $^k\alpha_{k+1}$ represents pre-integration of a relative velocity and a relative displacement, $^k\beta_{k+1}$ represents pre-integration of rotation, $\alpha_m$ represents a measured relative velocity and a measured relative displacement, $b_a$ represents an offset error of a linear acceleration, $n_\omega$ represents noise of an angular velocity, and $n_a$ represents noise of the linear acceleration.

S330. Construct a global status observation model.

Optionally, the global status observation model is constructed based on a result of the pre-integration in S320.

For example, the global status observation model in the global coordinate system may be constructed according to Formula (12), Formula (13), and Formula (14):

$$G_{p_{k+1}} = G_{p_k} + G_{v_k}\Delta T - \tfrac{1}{2}G_g\Delta T^2 + {}_k^G R^k\alpha_{k+1} \tag{12}$$

$$G_{v_{k+1}} = G_{v_k} - G_g\Delta T + {}_k^G R^k\beta_{k+1} \tag{13}$$

$${}_G^{k+1}\bar{q} = {}_k^{k+1}\bar{q} \otimes {}_G^k\bar{q} \tag{14}$$

where $G_g$ represents the gravity acceleration in the global coordinate G, $G_{p_{k+1}}$ represents a position in the global coordinate system G, $G_{v_{k+1}}$ represents a velocity in the global coordinate system G, ${}_G^{k+1}\bar{q}$ represents rotation in the global coordinate system G, $\Delta T$ represents a time difference between two adjacent frames, $^k\alpha_{k+1}$ represents pre-integration of a relative velocity and a relative displacement, and $^k\beta_{k+1}$ is pre-integration of the rotation.

S340. Construct a pre-integration factor according to the global status observation model.

For example, the pre-integration factor may be constructed according to Formula (15):

$$r_I(x) = \begin{bmatrix} 2vec\left({}_G^{k+1}\bar{q} \otimes {}_G^k\bar{q}^{-1} \otimes {}_k^{k+1}\bar{q}^{-1} \otimes \bar{q}(\Delta b_w)^{-1}\right) \\ b_{w(k+1)} - b_{w(k)} \\ \left({}_G^k R(G_{v_{k+1}} - G_{v_k} + G_g\Delta T) - \right. \\ \left. {}^k\tilde{\beta}_{k+1} - \frac{\partial \beta}{\partial b_a}\Big|_{\bar{b}_a}\Delta b_a - \frac{\partial \beta}{\partial b_w}\Big|_{\bar{b}_w}\Delta b_w\right) \\ b_{a(k+1)} - b_{a(k)} \\ \left({}_G^k R\left(G_{p_{k+1}} - G_{p_k} - G_{v_k}\Delta T + \tfrac{1}{2}G_g\Delta T^2\right) - \right. \\ \left. {}^k\tilde{\alpha}_{k+1} - \frac{\partial \alpha}{\partial b_a}\Big|_{\bar{b}_a}\Delta b_a - \frac{\partial \alpha}{\partial b_w}\Big|_{\bar{b}_w}\Delta b_w\right) \end{bmatrix}, \tag{15}$$

where $r_I(x)$ represents a residual of a global status observation model constructed through pre-integration based on the IMU, $_G^I\bar{q}$ represents rotation transformation from the global coordinate system G to an IMU coordinate system I, $^G v_I$ represents a velocity in the global coordinate system, $^G p_I$ represents a position in the global coordinate system G, $G_g$ represents a gravity acceleration in the global coordinate G, $G_{p_{k+1}}$ represents a position in the global coordinate system G, ${}_G^{k+1}\bar{q}$ represents rotation in the global coordinate system G, $^k\alpha_{k+1}$ represents pre-integration of a relative velocity and a relative displacement, $^k\beta_{k+1}$ represents pre-integration of rotation, $b_g$ represents an offset error of a gyroscope, $b_a$ represents an offset error of an accelerometer, $\Delta T$ represents a time difference between two adjacent frames, $\Delta b_a$ represents a difference between offset errors of linear accelerations of the two adjacent frames, and $\Delta b_w$ represents a difference between offset errors of angular velocities of the two adjacent frames.

Optionally, an object function may be constructed based on the plane feature factor and the pre-integration factor.

Constructing the object function based on the plane feature factor and the pre-integration factor may include constructing a status variable based on the plane feature factor and the pre-integration factor, and constructing the object function based on the status variable x.

For example, the status variable may be constructed according to Formula (16):

$$x = [x_\Pi, x_I] \tag{16}$$

where $x_\Pi$ represents a plane feature status, and may be expressed by using Formula (17), and $x_I$ represents an IMU status, and may be expressed by using Formula (18):

$$x_\Pi = G\Pi \tag{17}$$

$$x_I = [{}_G^I\bar{q}^T\ b_g^T\ {}^G v_I^T\ b_a^T\ {}^G p_I^T]^T \tag{18}$$

In Formula (18), $_G^I\bar{q}$ represents rotation transformation from the global coordinate system G to the IMU coordinate system I, $^G v_I$ represents a velocity of the IMU in the global coordinate system, $^G p_I$ represents a position of the IMU in the global coordinate system, $b_g$ represents an offset error of a gyroscope, and $b_a$ represents an offset error of an accelerometer.

For example, the object function may be constructed according to Formula (19):

$$\hat{x} = \left[\sum_i \|r_{Pi}(x)\|^2_{R_{\Pi i}} + \sum_j \|r_{Ij}(x)\|^2_{R_{Ij}}\right], \quad (19)$$

where $r_{p_i}(x)$ is shown in Formula (7), and $r_{I_j}(x)$ is shown in Formula (15).

In this embodiment of this application, the plane feature factor and the pre-integration factor are combined, so that precision of a pose and a map output by a SLAM method may be improved.

Optionally, pose estimation may be performed according to the object function to output a pose of the intelligent device.

In this embodiment of this application, a factor graph may be constructed according to the object function, and the pose estimation may be solved by using the factor graph.

S260. Perform, by using the target first 3D point as a constraint, mapping on an area that the intelligent device passes.

Optionally, S260 may be performed by the back end 120 of the SLAM system in FIG. 1.

In this embodiment of this application, the mapping may be completed based on the pose estimation, and a pose and a map may be output simultaneously.

In this case, it is required to determine whether a SLAM process ends, and if the SLAM does not end, loop iteration is performed in S210 to S260.

It should be understood that this application does not limit a sequence and a manner in which the steps in the method 200 are performed.

Figure 4:
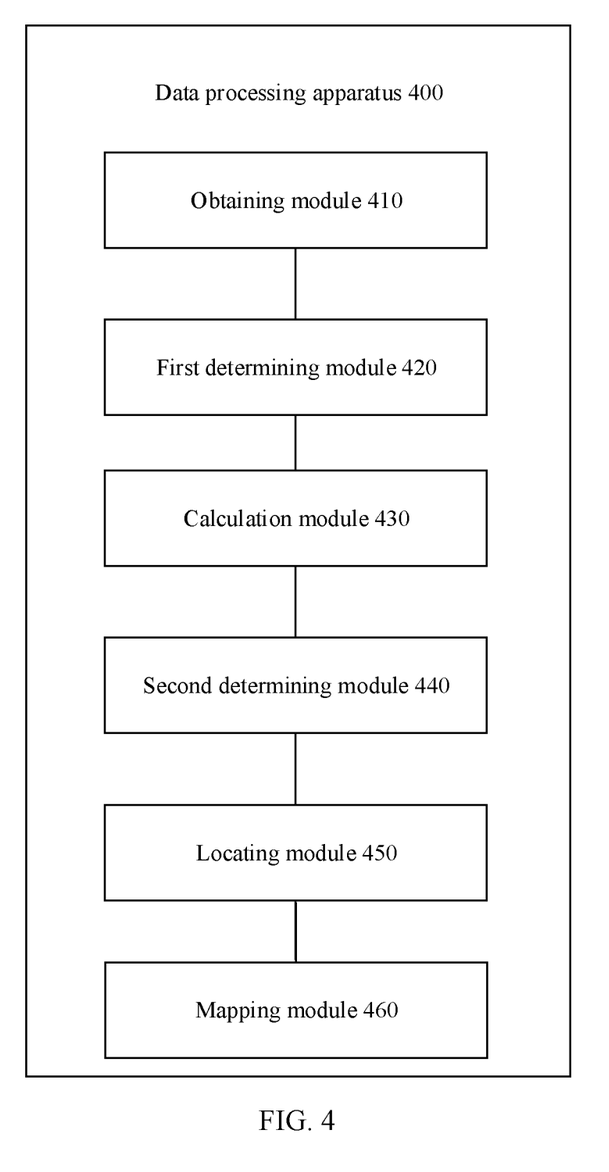
FIG. 4 is a schematic block diagram of a data processing apparatus according to an embodiment of this application.

FIG. 4 is a schematic block diagram of a data processing apparatus according to an embodiment of this application. It should be understood that the data processing apparatus 400 shown in FIG. 4 is merely an example, and the apparatus in this embodiment of this application may further include other modules or units.

The apparatus 400 may include an obtaining module 410, a first determining module 420, a calculation module 430, a second determining module 440, a locating module 450, and a mapping module 460. Each module included in the apparatus 400 may be implemented in a software and/or hardware manner.

For example, the obtaining module 410 may be a receiver, and the first determining module 420, the calculation module 430, the second determining module 440, the locating module 450, and the mapping module 460 may be a processor.

For another example, the obtaining module 410 may be a communications interface, and the first determining module 420, the calculation module 430, the second determining module 440, the locating module 450, and the mapping module 460 may be a processor. In this case, the apparatus 400 may be a chip.

Optionally, the first determining module 420 and the second determining module 440 may be a same module.

Optionally, the locating module 450 and the mapping module 460 may be a same module.

Optionally, the apparatus 400 may further include a memory that is configured to store program code executed by the processor and may even be configured to store data.

The apparatus 400 may be configured to perform the steps in the method described in any one of FIG. 2 or FIG. 3.

For example, the obtaining module 410 is configured to obtain data of each 3D point in a first 3D point set, where the data of each 3D point in the first 3D point set is collected when an intelligent device is in a first position, and the first 3D point set includes a plurality of 3D points located in a first coordinate system.

The first determining module 420 is configured to determine a first 3D point subset from the first 3D point set, where the first 3D point subset forms a first plane, and the first plane is any plane within the first coordinate system.

The calculation module 430 is configured to calculate a plurality of first distances, where the first distance is a distance between a first 3D point and the first position, the first distance is in a one-to-one correspondence with the first 3D point, and the first 3D point is any 3D point in the first 3D point subset.

The second determining module 440 determines a target first 3D point from the first 3D point subset based on the plurality of first distances.

The locating module 450 is configured to locate the intelligent device by using the target first 3D point as a constraint to obtain a pose of the first position.

In a possible implementation, the apparatus further includes:

the mapping module 460, configured to perform, by using the target first 3D point as a constraint, mapping on an area that the intelligent device passes.

In a possible implementation, the target first 3D point is a 3D point at a smallest distance from the first position in the first 3D point subset.

In a possible implementation, the first position is an origin of the first coordinate system and the first distance is the distance between the 3D point corresponding to the first distance and the origin of the first coordinate system.

In a possible implementation, the obtaining module 410 is further configured to obtain data of each 3D point in a second 3D point set, where the data of each 3D point in the second 3D point set is collected when the intelligent device is in a second position, and the second 3D point set includes a plurality of 3D points located in a second coordinate system.

The first determining module 420 is further configured to determine a second 3D point subset from the second 3D point set, where the second 3D point subset forms a second plane, and the second plane is any plane within the second coordinate system.

The calculation module 430 is further configured to calculate a plurality of second distances, where the second distance is a distance between a second 3D point and the second position, the second distance is in a one-to-one correspondence with the second 3D point, and the second 3D point is any 3D point in the second 3D point subset.

The second determining module 440 is further configured to determine a target second 3D point from the second 3D point subset based on the plurality of second distances.

In a possible implementation, the locating module 450 is specifically configured to:

locate the intelligent device by using a residual between a first vector and a second vector as a constraint, where the residual includes a distance between the first vector and the second vector, the first vector starts from the first position, the first vector ends at the target first three-dimensional point, the first vector is used to determine the first plane in the first coordinate system, the second vector starts from the second position, the second vector ends at the target second three-dimensional point, and the second vector is used to determine the second plane in the second coordinate system.

In a possible implementation, the target second 3D point is a 3D point at a smallest distance from the second position in the second 3D point subset.

In a possible implementation, the second position is an origin of the second coordinate system and the second distance is the distance between the 3D point corresponding to the second distance and the origin of the second coordinate system.

In a possible implementation, the locating module 450 is specifically configured to: determine projection of the second vector in the first coordinate system, and use a residual between projection of the first vector in the first coordinate system and the projection of the second vector in the first coordinate system as a constraint when a distance between the projection of the first vector in the first coordinate system and the projection of the second vector in the first coordinate system is less than or equal to a preset distance.

In a possible implementation, the locating module 450 is specifically configured to: determine projection of the first vector in the second coordinate system, and use a residual between the projection of the first vector in the second coordinate system and projection of the second vector in the second coordinate system as a constraint when a distance between the projection of the first vector in the second coordinate system and the projection of the second vector in the second coordinate system is less than or equal to a preset distance.

In a possible implementation, the locating module 450 is specifically configured to: obtain motion status information collected by an inertial measurement unit, where the motion status information includes motion status information used when the intelligent device collects data of the first three-dimensional point in the first position and motion status information used when the intelligent device collects data of the second three-dimensional point in the second position; and locate the intelligent device by using the motion status information and the residual between the first vector and the second vector as a constraint.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces.

The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

It should be understood that, the processor in the embodiments of this application may be a central processing unit (CPU), or may further be another general purpose processor, a digital signal processor (DSP), an application specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

It should be understood that "I" in this application represents the meaning of "or". "and/or" may include three parallel solutions. For example, "A and/or B" may include: "A", "B", and "A and B". It should be understood that "A or B" in this application may include: "A", "B", and "A and B".

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data processing method, comprising:
   obtaining, by an intelligent device, data of a first plurality of three-dimensional points, wherein the data is collected when the intelligent device is in a first position, and the first plurality of three-dimensional points located in a first coordinate system;

determining a first three-dimensional point subset from the first plurality of three-dimensional points, wherein the first three-dimensional point subset forms a first plane, and the first plane is a plane within the first coordinate system;

calculating a plurality of first distances between first three-dimensional points in the first three-dimensional point subset and the first position;

determining a target first three-dimensional point from the first three-dimensional point subset based on the plurality of first distances;

obtaining second data of a second plurality of three-dimensional points, wherein the second data is collected when the intelligent device is in a second position, and the second plurality of three-dimensional points located in a second coordinate system;

determining a second three-dimensional point subset from the plurality of second three-dimensional points, wherein the second three-dimensional point subset forms a second plane, and the second plane is a plane within the second coordinate system;

calculating a plurality of second distances between second three-dimensional points in the second three-dimensional point subset and the second position;

determining a target second three-dimensional point from the second three-dimensional point subset based on the plurality of second distances; and locating the intelligent device by using the target first three-dimensional point and the target second three-dimensional point as a constraint to obtain a pose of the first position, wherein the locating the intelligent device by using the target first three-dimensional point and the target second three-dimensional point as a constraint comprises:

locating the intelligent device by using a residual between a first vector and a second vector as a constraint, wherein the residual comprises a distance between the first vector and the second vector, the first vector starts from the first position, the first vector ends at the target first three-dimensional point, the first vector is used to determine the first plane in the first coordinate system, the second vector starts from the second position, the second vector ends at the target second three-dimensional point, and the second vector is used to determine the second plane in the second coordinate system.

2. The method according to claim 1, wherein the method further comprises:

performing, by using the target first three-dimensional point as a constraint, mapping on an area that the intelligent device passes through.

3. The method according to claim 1, wherein the target first three-dimensional point is a three-dimensional point at a smallest distance from the first position in the first three-dimensional point subset.

4. The method according to claim 1, wherein the first position is an origin of the first coordinate system.

5. The method according to claim 1, wherein the target second three-dimensional point is a three-dimensional point at a smallest distance from the second position in the second three-dimensional point subset.

6. The method according to claim 1, wherein the second position is an origin of the second coordinate system.

7. The method according to claim 1, wherein before the using a residual between a first vector and a second vector as a constraint, the method further comprises:

determining a projection of the second vector in the first coordinate system, and using a residual between a projection of the first vector in the first coordinate system and the projection of the second vector in the first coordinate system as a constraint when a distance between the projection of the first vector in the first coordinate system and the projection of the second vector in the first coordinate system is less than or equal to a preset distance; or determining a projection of the first vector in the second coordinate system, and using a residual between the projection of the first vector in the second coordinate system and a projection of the second vector in the second coordinate system as a constraint when a distance between the projection of the first vector in the second coordinate system and the projection of the second vector in the second coordinate system is less than or equal to a preset distance.

8. The method according to claim 1, wherein the locating the intelligent device by using a residual between a first vector and a second vector as a constraint comprises:

obtaining motion status information collected by an inertial measurement unit, wherein the motion status information comprises motion status information used when the intelligent device collects data of the first three-dimensional point in the first position and motion status information used when the intelligent device collects data of the second three-dimensional point in the second position; and locating the intelligent device by using the motion status information and the residual between the first vector and the second vector as a constraint.

9. A data processing apparatus, comprising:

a communications interface, configured to obtain data of a first plurality of three-dimensional points, wherein the data is collected when an intelligent device is in a first position, and the first plurality of three-dimensional points located in a first coordinate system;

at least one processor, configured to determine a first three-dimensional point subset from the first plurality of three-dimensional points, wherein the first three-dimensional point subset forms a first plane, and the first plane is a plane within the first coordinate system;

the processor is further configured to calculate a plurality of first distances between first three-dimensional points in the first three-dimensional point subset and the first position;

the processor is further configured to determine a target first three-dimensional point from the first three-dimensional point subset based on the plurality of first distances;

the processor is further configured to obtain second data of a second plurality of three-dimensional points, wherein the second data is collected when the intelligent device is in a second position, and the second plurality of three-dimensional points located in a second coordinate system;

the processor is further configured to determine a second three-dimensional point subset from the plurality of second three-dimensional points, wherein the second three-dimensional point subset forms a second plane, and the second plane is a plane within the second coordinate system;

the processor is further configured to calculate a plurality of second distances between second three-dimensional points in the second three-dimensional point subset and the second position;

the processor is further configured to determine a target second three-dimensional point from the second three-dimensional point subset based on the plurality of second distances;

the processor is further configured to locate the intelligent device by using the target first three-dimensional point and the target second three-dimensional point as a constraint to obtain a pose of the first position; and the processor is configured to locate the intelligent device by using a residual between a first vector and a second vector as a constraint, wherein the residual comprises a distance between the first vector and the second vector, the first vector starts from the first position, the first vector ends at the target first three-dimensional point, the first vector is used to determine the first plane in the first coordinate system, the second vector starts from the second position, the second vector ends at the target second three-dimensional point, and the second vector is used to determine the second plane in the second coordinate system.

10. The apparatus according to claim 9, wherein the processor is further configured to perform, by using the target first three-dimensional point as a constraint, mapping on an area that the intelligent device passes through.

11. The apparatus according to claim 9, wherein the target first three-dimensional point is a three-dimensional point at a smallest distance from the first position in the first three-dimensional point subset.

12. The apparatus according to claim 9, wherein the first position is an origin of the first coordinate system.

13. The apparatus according to claim 9, wherein the target second three-dimensional point is a three-dimensional point at a smallest distance from the second position in the second three-dimensional point subset.

14. The apparatus according to claim 9, wherein the second position is an origin of the second coordinate system.

15. The apparatus according to claim 9, wherein the processor is configured to:

determine a projection of the second vector in the first coordinate system, and use a residual between a projection of the first vector in the first coordinate system and the projection of the second vector in the first coordinate system as a constraint when a distance between the projection of the first vector in the first coordinate system and the projection of the second vector in the first coordinate system is less than or equal to a preset distance; or determine a projection of the first vector in the second coordinate system, and use a residual between the projection of the first vector in the second coordinate system and a projection of the second vector in the second coordinate system as a constraint when a distance between the projection of the first vector in the second coordinate system and the projection of the second vector in the second coordinate system is less than or equal to a preset distance.

16. The apparatus according to claim 9, wherein the processor is configured to:

obtain motion status information collected by an inertial measurement unit, wherein the motion status information comprises motion status information used when the intelligent device collects data of the first three-dimensional point in the first position and motion status information used when the intelligent device collects data of the second three-dimensional point in the second position; and locate the intelligent device by using the motion status information and the residual between the first vector and the second vector as a constraint.

17. The apparatus according to claim 9, wherein the apparatus is a chip integrated into an intelligent device, the chip including the communications interface.

18. A non-transitory computer-readable storage medium, wherein the computer-readable storage medium stores program code to be executed by a data processing apparatus, and the program code comprises instructions for performing the following data processing method:

obtaining, by an intelligent device, data of a first plurality of three-dimensional points, wherein the data is collected when the intelligent device is in a first position, and the first plurality of three-dimensional points located in a first coordinate system;

determining a first three-dimensional point subset from the first plurality of three-dimensional points, wherein the first three-dimensional point subset forms a first plane, and the first plane is a plane within the first coordinate system;

calculating a plurality of first distances between first three-dimensional points in the first three-dimensional point subset and the first position;

determining a target first three-dimensional point from the first three-dimensional point subset based on the plurality of first distances;

obtaining second data of a second plurality of three-dimensional points, wherein the second data is collected when the intelligent device is in a second position, and the second plurality of three-dimensional points located in a second coordinate system;

determining a second three-dimensional point subset from the plurality of second three-dimensional points, wherein the second three-dimensional point subset forms a second plane, and the second plane is a plane within the second coordinate system;

calculating a plurality of second distances between second three-dimensional points in the second three-dimensional point subset and the second position;

determining a target second three-dimensional point from the second three-dimensional point subset based on the plurality of second distances; and locating the intelligent device by using the target first three-dimensional point and the target second three-dimensional point as a constraint to obtain a pose of the first position, wherein the locating the intelligent device by using the target first three-dimensional point and the target second three-dimensional point as a constraint comprises:

locating the intelligent device by using a residual between a first vector and a second vector as a constraint, wherein the residual comprises a distance between the first vector and the second vector, the first vector starts from the first position, the first vector ends at the target first three-dimensional point, the first vector is used to determine the first plane in the first coordinate system, the second vector starts from the second position, the second vector ends at the target second three-dimensional point, and the second vector is used to determine the second plane in the second coordinate system.

* * * * *